Patented July 19, 1932

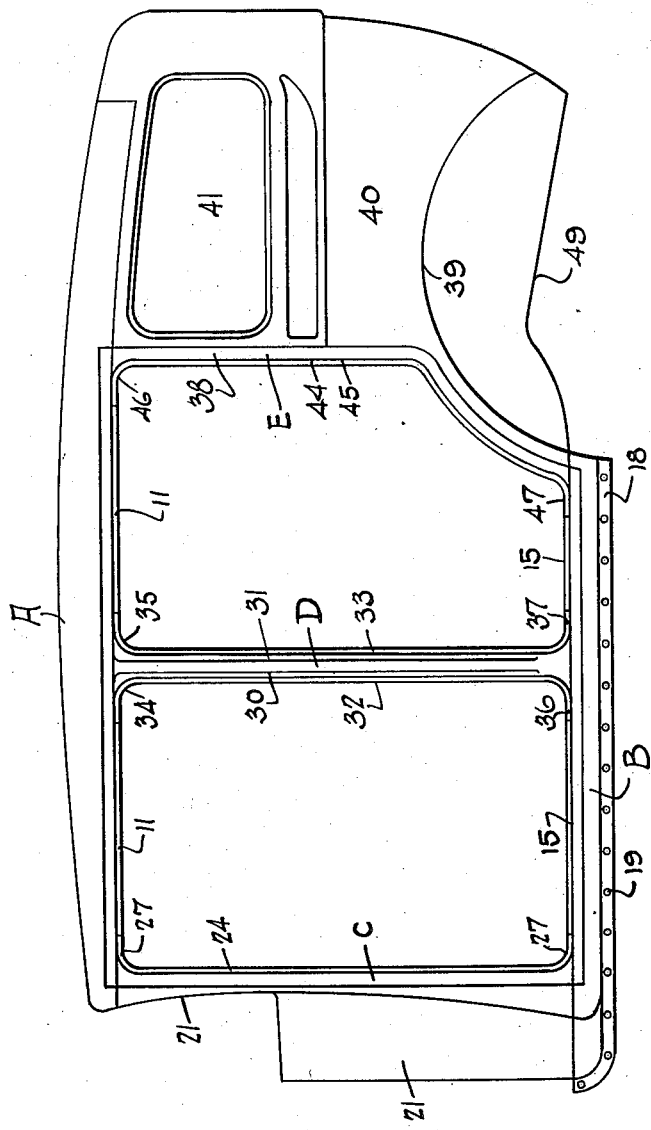

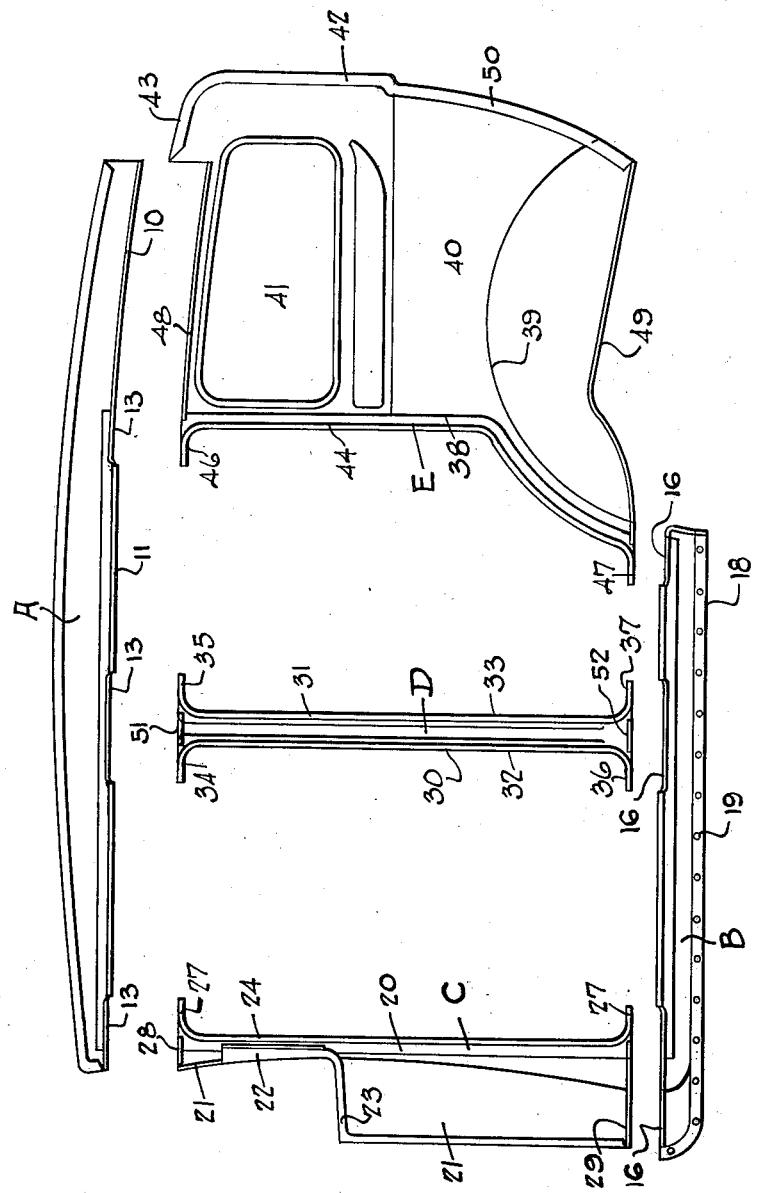

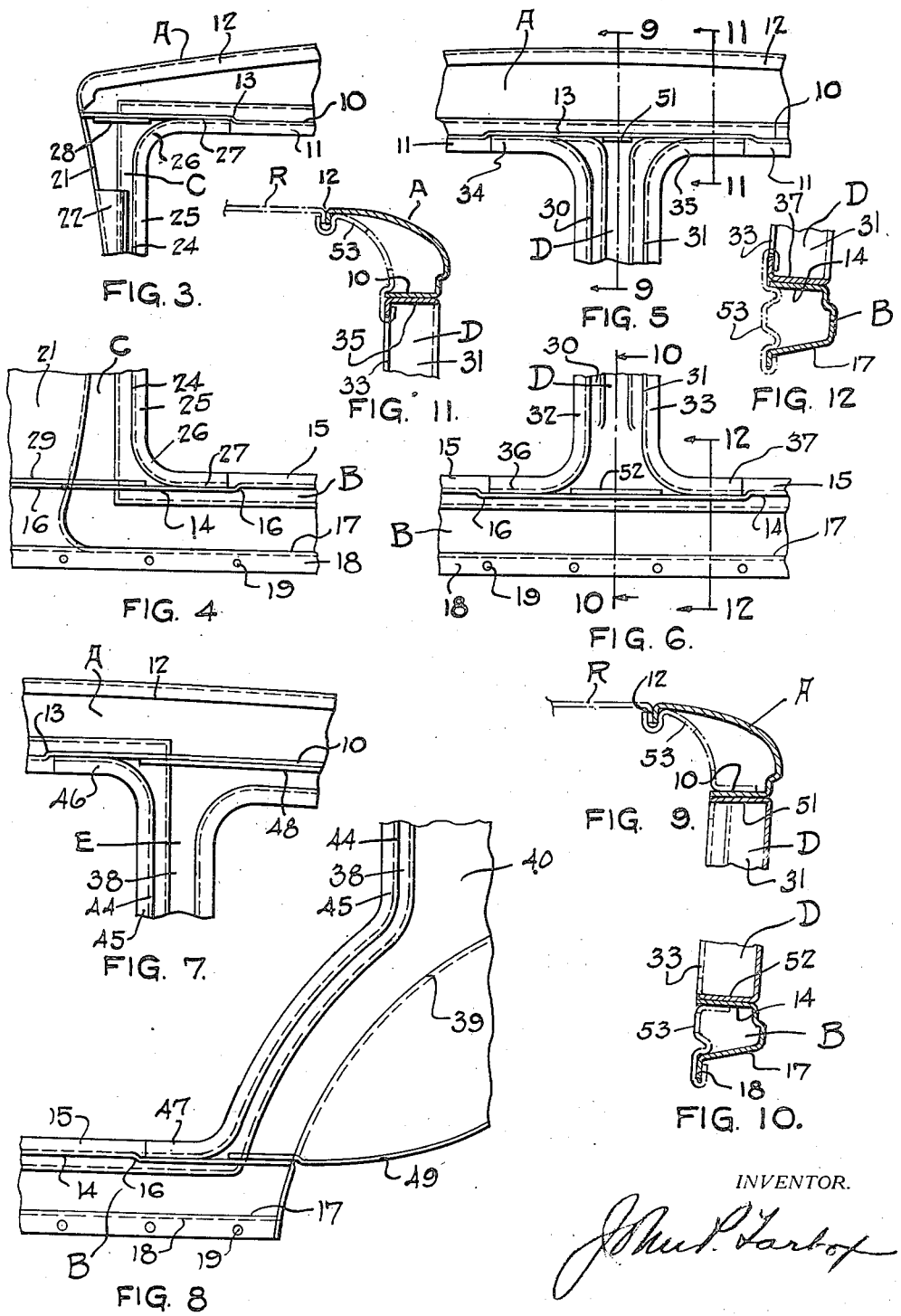

1,867,777

UNITED STATES PATENT OFFICE

JOHN P. TARBOX, OF PHILADELPHIA, PENNSYLVANIA, ASSIGNOR TO EDWARD G. BUDD MFG. COMPANY, OF PHILADELPHIA, PENNSYLVANIA, A CORPORATION OF PENNSYLVANIA

VEHICLE BODY WALL CONSTRUCTION

Application filed September 1, 1927. Serial No. 216,907.

My invention relates to vehicle bodies, and particularly to such bodies having side walls comprising relatively deep-drawn pressed metal stampings.

In the manufacture of such bodies it has been proposed to make the entire side of the body out of a unitary sheet metal stamping flanged inwardly at the door openings, and in its outer margin, to form a stamping in which the draws are relatively deep. Such construction requires metal sheets of great extent and dies of corresponding size and weight, and the sheets so used and the stampings so formed are relatively hard to handle, and if one such stamping is defective, it often requires the scraping of the entire side. This construction is, however, attended with the advantage of light weight, combined with great strength and durability in that, because of the deep draws and the conformation to the body curvature of the modern car body, it forms an inter-communicating channel car body structure, and particularly when this inter-communicating channel structure is joined together in the margins by an inner light gauge reinforcing panel, to produce, in effect, a hollow trussed structure of great rigidity and strength.

It is an object of my invention to retain substantially all of the advantages incident to the use of these side sub-assemblies made out of a single unitary stamping, particularly its light weight and great strength and durability, without unduly increasing the number of dies and forming operations and the subsequent joining operations, but by enabling smaller sheets to be utilized, resulting in easier handling and less waste.

To this end, I propose to make the sides of the body of a series of unitary stampings which can be stamped out of smaller sheets, are more readily handled and are efficiently and readily joined together in final assembly by a welding jig. I accomplish this object by forming the top headers and the thresholds at the sides of the body each of a unitary stamping, and by forming the vertical connecting posts, in the case of the sedan type of body illustrated herein, the A-posts, the B-C posts and the D posts, also of unitary stampings each flared at their tops and bottoms to form the rounded corners of the doors. In the case of the sedan type of body shown, I preferably form the cowl side out of the same unitary stamping as the A-post and the tonneau side out of the same unitary stamping as the D-post. This reduces the number of parts and operations without materially affecting the ease of handling and the forming operations. On these smaller units, the deep draws around the doorway openings and in the margins are quite readily formed.

Other and further objects and advantages and the manner in which they are attained will be apparent from the following description taken in connection with the drawings showing one embodiment of the invention and in which, Fig. 1 shows in side elevation, a side unitary sub-assembly of a sedan type of body embodying the invention, as seen from the inside.

Fig. 2 is an exploded view of the unitary stampings, before assembly to form the complete sub-assembly shown in Fig. 1.

Fig. 3 is a detail in elevation view of the joint between the top of the front or A-post and the side header or top rail.

Fig. 4 is a similar view of the joint between the bottom of the A-post and cowl side and the threshold unit.

Figs. 5 and 6 are, respectively, views similar to Figs. 3 and 4, but showing the joints, between the B-C post and the top rail unit and the threshold unit, respectively.

Figs. 7 and 8 are respectively corresponding views to Figs. 3 and 4 and 5 and 6, of the joint between the rear or D-post and the tonneau side and the top rail unit and the threshold unit respectively.

Figs. 9, 10, 11 and 12 are detail sectional views taken, respectively, on the lines 9—9 of Fig. 5, 10—10 of Fig. 6, 11—11 of Fig. 5 and 12—12 of Fig. 6.

In the drawings, the unitary side sub-assembly consisting principally of an outer deep drawn paneling of relatively light gauge sheet metal stampings is comprised of five units, the top header or top rail unit A, the threshold unit B, the front or A-post unit C, the intermediate or B-C post unit D, and the rearmost door or D-post unit E.

According to the present embodiment of the invention, to top rail unit A is a unitary stamping extending from the front or A-post to approximately the rear edge of the rear window opening of the tonneau. Along its lower edge it has an inwardly extending flange 10 above the door openings. This flange is a width substantially equal to the thickness of the door or body wall and is formed with a downwardly extending flange 11 forming a door overlap. The stamping A is arched inwardly at the top to form the side quarter of the roof and is provided with a flange 12 along its inner edge for joinder to a roof section indicated at R, Fig. 11.

Where it is joined to the vertically extending post units, the flange 10 of the top rail unit is offset upwardly an amount equal substantially to the thickness of the metal forming the units as indicated at 13.

These offset portions 13 provide not only a flush joinder of the outer surfaces of the adjoining units, but they also serve as locating means in the assembly of the parts.

The threshold unit B has along its upper edge an inwardly extending flange 14 similar to the flange 10 on the top rail unit A and forming in the doorway openings the thresholds of the doors. In the doorways the flange 14 is provided with a door overlap flange 15 similar to the flange 11 of the top rail, and where it is joined to the vertically extending units, the flange 14 is offset downwardly at 16 similar to the offsets 13 and for a like purpose. I have shown the threshold unit as extending from the front of the cowl to the rearmost door or D-post. In its lower portion it is flanged inwardly as at 17, Figs. 10 and 12, and then downwardly at 18. This flange 18 is provided with holes 19 through which the body side may be secured to an underframe or chassis (not shown) as by riveting or bolting.

The front or A-post unit comprises, in the present embodiment of my invention, not only the inwardly presenting channel section A-post 20 but also the side 21 of the cowl. The forward wall 21' of the A-post is provided above the belt line with a rearwardly extending flange 22 which flange merges into the downwardly extending flange 23 at the top of the cowl side 21 and provides a means for securing the side sub-assembly of my invention, in the final assembly, to an intermediate front unit comprising a windshield frame and cowl top (not shown).

The rear wall 24 of the A-post corresponds in depth to the portions of the flanges 10 and 14, respectively, on the top rail and threshold units and is provided like them with a laterally extending flange 25 forming the door overlap. At the top and bottom, the A-post is flared or widened to form a wide seating surface where it is joined to the top rail and threshold units, and its rear wall 24 is extended around the corner of the door opening on a wide curve as at 26 to form the well rounded door opening corners. The ends 27 of the rear wall 24 overlap the offset portions 13 and 16 respectively of the flanges 10 and 14 and the ends of the flange 25 abut, respectively, the forward ends of the flanges 11 and 15, thus forming a continuous door jamb surface and a continuous door overlap, when the parts are assembled, as by welding the ends 27 of the rear side wall 24 to the offset portions of the top rail and threshold units.

To further secure the top of the A-post unit to the top rail, it is provided at the top with an inwardly projecting flange 28 which is welded or otherwise secured to the offset portion 13 of the flange 10 of the top rail unit A. The cowl side 21 is provided at the bottom with an inwardly extending flange 29 which is welded or otherwise secured to the offset portion 14 of the flange 16 on the threshold unit B.

The B-C post unit D comprises a channel section post the front and rear side walls 30 and 31 of which are, like the rear wall 24, of the front post, of a depth substantially equal to the thickness of the door and are provided with the laterally extending door overlap flanges 32 and 33, respectively.

This post is, like the A-post, flared or widened at both ends and its front and rear walls 30 and 31 are extended at top and bottom around the corners of the front and rear door openings on wide curves, their ends 34, 35, 36 and 37, overlapping respectively the intermediate offset portions 13 and 16 of the top and bottom units and being secured thereto, as by welding.

As at the A-post, the flanges 32 and 33 abut, respectively, the adjacent ends of the front and rear door overlap flanges 11 and 15 of the top rail and threshold units.

The outside wall of the B-C post is provided at top and bottom with the flanges or tabs 51 and 52 adapted to be secured, as by welding to the respective units A and B.

The D-post unit E comprises in the present embodiment of my invention not only the D-post proper 38, the lower portion of which is arched forwardly to conform to the contour of the wheel housing depression 39 but also the side portion 40 of the tonneau including the wheel housing 39 and the rear quarter window opening 41, as well as the rear quarter 42 and the roof quarter 43.

The front wall 44 of the D-post is formed, like the A and D-posts, with a lateral door overlap flange 45, and the formation of the ends of the D-post and their joinder to the top rail and threshold units through the ends 46 and 47, respectively overlapping the offset portions 13 and 16 of those units, is substantially the same as at the A-post and need not be further described.

Further joinder to the top rail unit is effected through an inwardly extending flange 48 at the top of the tonneau which overlaps and is secured to the rear offset portion of the flange 10 of the top rail unit.

At the bottom the wheel housing portion of the tonneau is flanged inwardly as at 49, and the forward end of this flange overlaps and is secured, as by welding, to the rear offset portion 16 of the flange 14 on the threshold unit.

The rear edge of the tonneau 40 is flanged forwardly at 50 and this flange is utilized to join the side sub-assembly in final assembly to an adjoining rear unit (not shown).

The unitary stampings formed as described are readily formed by relatively simple stamping and drawing operations and are readily brought together in a suitable final assembly jig and welded or otherwise strongly secured together through the generous contacting areas of the various abutting flanges on adjacent units. When so united, they form a very light but exceedingly rigid and strong and durable side wall construction, which may or may not be combined with inner reinforcing panels or stampings as indicated in dotted lines at 53.

This inner reinforcing member or members may be a single stamping or separate stampings, joined to the outer deep drawn combined frame and shell formed by the unitary stampings, as described, by crimping and welding or otherwise.

While I have herein described a specific embodiment of my invention, I am aware that various changes and modifications may be made departing from this precise construction, but not departing from the generic spirit of the invention, and I desire to reserve to myself all such modifications and changes as fall within the spirit and scope of the following claims.

What I claim is:

1. In a vehicle body, a pressed metal door frame comprising a horizontal and a vertical member together serving at both framing and outer paneling, each of said members comprising a unitary stamping flanged inwardly around the doorway opening, to a depth substantially equal to the thickness of the body wall, the vertically extending member being flared at the end in which it joins the horizoital member, the inwardly extending flange thereof being formed on a generous curve to form a rounded corner for the doorway opening and overlapping and directly secured at its end to the inwardly extending flange of the horizontal member extended beyond the door opening.

2. In a vehicle body, a pressed metal door frame comprising a horizontal and a vertical member together serving as both framing and paneling, each being flanged inwardly around the doorway opening to a depth substantially equal to the thickness of the body wall, the vertically extending member being flared at its end and its inwardly extending flange being formed on a widely rounded curve to form the corner of the doorway opening and having a horizontal end extension, and the flange of the horizontal member being offset to receive the horizontal end extension of the flange of the vertical member within the offset and directly secured thereto, thereby providing a continuous smooth inwardly flanged edge in the doorway opening extending from the vertical around said corner into the horizontal beyond said offset.

3. In a vehicle body, a pressed metal door frame comprising upper and lower horizontal members and a vertical member joining the horizontal members, each of said members comprising a unitary stamping forming both framing and outer paneling and flanged inwardly around the door way opening to a depth substantially equal to the thickness of the body wall, the vertically extending member being flared at both ends and the flanges thereof being formed in said flared portions with generous curvatures to form the adjacent corners of the doorway openings and extended horizontally and secured to said upper and lower members through the flanges thereon extended beyond the doorway opening, and adapted to receive the horizontally extending ends of the flanges on the vertical member.

4. In a vehicle body a pressed metal door frame comprising a horizontal and a vertical member, each of said members comprising a unitary stamping forming both framing and paneling and flanged inwardly around the doorway opening to a depth substantially equal to the thickness of the body wall, the end of the vertical member being flared to provide a flange of generous curvature at the corner of the doorway opening and having a horizontal end extension, said end extension being secured to the flange of the horizontal member, the body of the vertical member being also flanged transversely at its end and secured to the flange of the horizontal member.

5. A side header unit for vehicle bodies comprising a unitary stamping forming both framing and paneling extending from the front post to the rearmost post and forming a portion of the outside surface of the body throughout its longitudinal extent and flanged inwardly along its lower edge to form the tops of the door jambs and adapted to be secured through said flange to vertically extending side units, said inwardly flanged lower edge having offsets adapted to locate and snugly receive the ends of the door posts.

6. A tonneau side unit for vehicle bodies comprising a unitary stamping including the side wall of the tonneau from the bottom of the body to the roof and also the main strength-giving portion of the rearmost door post structure, the tonneau side wall portion and the rearmost door post portion being flanged inwardly, respectively, at the top and in the edge of the doorway opening a depth substantially equal to the thickness of the body wall, said post structure flange being extended forwardly at the top to provide a horizontal end projection, and an adjoining sheet metal top rail unit serving as both framing and paneling and comprised of a unitary stamping flanged inwardly along its lower edge to a depth substantially equal to the thickness of the body wall and joined to the tonneau side unit through said inwardly extending flange at the top of the tonneau side wall portion and through said horizontal end projection of the rearmost door post structure.

In testimony whereof he hereunto affixes his signature.

JOHN B. TARBOX.